United States Patent Office 3,574,113

Patented Apr. 6, 1971

3,574,113

METHOD OF PRODUCING CALCIUM SILICATE TYPE HIGH TEMPERATURE THERMAL INSULATION MATERIALS

Richard F. Shannon, Lancaster, Ohio, assignor to Owens-Corning Fiberglas Corporation No Drawing. Filed Apr. 18, 1968, Ser. No. 722,201
Int. Cl. C04b 43/04, 15/12
U.S. Cl. 252—62 14 Claims

ABSTRACT OF THE DISCLOSURE

An improved method of forming high strength high temperature insulation materials wherein an undisrupted tobermorite gel network having the formula $$3CaO \cdot 2SiO_2 \cdot 3H_2O$$

is first formed between dispersed fibers in a slurry and this network is thereafter transformed in an autoclaving process to calcium silicate crystals having a calcia to silica ratio of less than approximately one. The conversion of the tobermorite gel to crystals is accomplished by the diffusion of silica into the gel network. Free lime and silica are distributed throughout the gel, and during autoclaving, the silica is dissolved by the free lime and made available for diffusion into the crystalline lattice of the tobermorite gel. The tobermorite gel network is set to the fibers by the heating of calcium silicate slurries consisting of either dicalcium silicate, or tricalcium silicate, or both in an abundance of water at temperatures between 160° F. and 212° F. The formation of the gel between the fibers must be complete and must not be disrupted, or dried, prior to the autoclaving process.

BACKGROUND OF THE INVENTION

Calcium silicate type high temperature insulation materials have been made commercially heretofore by one of three general types of processes. In the first type of process, lime, silica, and asbestos are mixed into an aqueous slurry, the slurry is poured into molds, and the slurry filled molds are heated in an autoclave at superatmospheric pressures up to approximately 250 p.s.i. to convert the lime and silica into crystalline calcium silicate.

In the second type of commercially used process, lime, silica and asbestos are mixed into a slurry using a water to solids ratio of more than approximatel 12:1, and the slurry is heated to approximately 200° F. to completely hydrate the lime into a gelatinous or thickened state. The solids of the slurry are filtered into a desired shape having a water to solids ratio less than approximately 4.0 to 1. The filtered solids are sufficiently rigid after the filtering step that they can be handled, and the pieces are placed in an autoclave and heated at superatmospheric pressures up to approximately 250 p.s.i. Because the slurry is cooked at temperatures below 212° F., very little of the silica is dissolved in the slurry cooking process and the thickening is due primarily to hydration.

In the third type of commercially used process, lime, silica, and asbestos are mixed into a slurry using a water to solids ratio of between approximately 6 to 1 and 10 to 1, and the slurry is heated to approximately 200° F. to completely hydrate the lime into a gelatinous or thickened state. This slurry is poured into heated molds which causes the slurry to set up into a state having sufficient rigidity that the molded slurry can be stripped from the molds and handled. Thereafter the molded pieces are placed in an autoclave and heated at superatmospheric pressures up to approximately 250 p.s.i. to convert the calcia and silica into a calcium silicate binder.

When the slurries of lime and silica are heated to temperature below 212° F. in the above process, the thickening that results is due primarily to the hydration and thickening of the lime. When hydrated lime and silica are first heated after being placed in the autoclave, the materials are initially transformed into $$2CaO \cdot 1SiO_2 \cdot xH_2O$$

as disclosed in the Kalousek Pat. 2,665,996. When portland cement is hydrated at room temperature, as occurs in the pan molding process, the first product produced is a hydration of the portland cement to form $$2CaO \cdot 1SiO_2 \cdot xH_2O$$

Portland cement cannot be used in processes wherein the slurry is heated before the molding process because it sets up so quickly that it cannot be cast. In addition, movement after the portland cement has thickened, as occurs in the molding operation, disrupts the network of the hydrate to destroy the strength of the resulting product.

SUMMARY OF THE INVENTION

According to the invention, a new thermodynamic route to the production of xonotlite and tobermorite is obtained by first converting dicalcium silicate and/or tricalcium silicate into a tobermorite gel having the formula $$3CaO \cdot 2SiO_2 \cdot 3H_2O$$

The tobermorite gel forms a network bridging the fibrous reinforcing and surrounding free particles of silica and hydrated CaO. It has been found that unreacted hydrated calcia is required to adequately dissolve the free silica and carry it into solution, so that the dissolved silica can then diffuse into the tobermorite gel network and change its composition into one having a CaO to SiO ratio of one or less. If portland cement is substituted for all of the calcareous materials required, there is not enough driving force to dissolve the free silica and convert the tobermorite gel into the low calcia-silica ratio required for xonotlite or tobermorite. It has further been found that the tobermorite gel network required for a product of acceptable strength is only formed in the short time involved in the commercial processes described above, if the dicalcium silicate and tricalcium silicate are heated by steam at atmospheric pressure while the slurry is in a quiescent state and while the water to solids ratio is between 3.0 to 1 and 8.0 to 1. In order to form tobermorite gel from dicalcium and tricalcium silicates, $Ca(OH)_2$ must be split off and this process requires time and temperature. According to the invention, this is accomplished within a matter of an hour or so by heating above 160° F. but without autoclaving. If the calcium silicates are hydrated, and immediately autoclaved, a different type of crystalline growth is accomplished as taught by the Kalousek Pat. 2,665,996. In order that the tobermorite gel structure $3CaO \cdot 2SiO_2 \cdot 3H_2O$ can be converted into $5CaO \cdot 5SiO_2 \cdot 1H_2O$ or $4CaO \cdot 5SiO_2 \cdot 5H_2O$, silica must be diffused into the tobermorite gel structure. In order that this diffusion may take place, the tobermorite gel structure must be surrounded by water which is in contact with both CaO and $SiO_2$. It has been found that in order for the $SiO_2$ to be dissolved, uncombined CaO must be present adjacent the $SiO_2$ particles in order to provide a sufficient driving force to bring the $SiO_2$ into solution. The dissolved $SiO_2$ thereafter diffuses through the water into the tobermorite gel structure to transform the tobermorite gel structure into the finished calcium silicate crystals that are grown in situ to bridge the fibrous reinforcing material.

The principal object of the present invention, therefore, is the provision of a new and improved thermodynamic route for the production of xonotlite and/or tobermorite crystals in situ between fibrous reinforcing to form high temperature insulation material.

DESCRIPTION OF THE PREFERRED EMBODIMENTS

The following describes the production of a high temperature insulation material bonded together by a crystalline xonotlite structure and is produced according to the thermodynamic route of the present invention.

Example 1

An aqueous slurry is first produced from the following materials:

| Materials | Parts by weight | Percent by weight |
|---|---|---|
| Asbestos | 50 | 20.8 |
| Quicklime | 35 | 14.56 |
| Supersil [1] | 62.5 | 26.00 |
| Portland cement | 75.2 | 31.28 |
| Red iron oxide | 1.2 | 0.50 |
| Wollastonite | 16.5 | 6.86 |

[1] Supersil is a trademark of Pennsylvania Glass Sand for substantially pure silica.

The slurry is made by dispersing the asbestos in approximately one half of the total water used. The other half of the water is added to a Hydropulper mixer and the quicklime, Supersil, red iron oxide, and Wollastonite are added thereto and thoroughly mixed. After these materials are mixed and the quicklime hydrated, the portland cement is added. Thereafter, the dispersion of the asbestos is pumped into the Hydropulper and the material thoroughly mixed for approximately 15 minutes. The total water used is at 70° F. and is sufficient to give a water to solids ratio of 4.7 to 1. A slight rise in temperature is experienced by the hydration of the materials, and the maximum temperature produced is approximately 80° F. The slurry produced in the Hydropulper is pumped to a holding tank and the material from the holding tank is used to fill molds shaped to provide 3 inch thick block insulation. All of the material in the holding tank is pumped into molds within approximately 2 hours.

The molds which are used are made of steel, and the steel molds containing the slurry are placed in an atmospheric tunnel to which live steam is continually introduced to raise the temperature of the molds and contents to a temperature above 160° F. preferably between 180° F. and 210° F. The filled molds are left in the atmospheric tunnel, hereafter called a prehardener, for approximately 2 hours during which time the slurry is converted to a rigid structure which could if desired, be removed from the molds. The transition from the slurry to the hardened state is produced by the changing of the dicalcium and tricalcium silicates of the portland cement into a tobermorite gel having the formula $3CaO\cdot 2SiO_2\cdot 3H_2O$. The tobermorite gel formed during the prehardening forms a network which bonds to the asbestos and extends throughout the material in the mold to encase the particles of silica and lime. Thereafter the molds and their gelled contents are placed in an autoclave, and steam at 250 pounds pressure is introduced to bring the pressure in the autoclave to 250 pounds per square inch within approximately one half hour, thereafter heating coils within the autoclave gradually raise the temperature in the autoclave to a temperature of approximately 550° F. When 3 inch thick flat ware is produced, this temperature is held for a 3 hour period. The autoclave is then depressurized over a period of approximately one half hour, during which time the temperature of the heating coils is maintained to keep the contents of the autoclave at 600° F. (for the purpose of drying the material in the molds). During the autoclaving process, the tobermorite gel is substantially completely changed to xonotlite having the formula $5CaO\cdot 5SiO_2\cdot 1H_2O$.

The molds are removed form the autoclave and the pieces of insulation removed from the molds, and the insulation is then finish dried in air. After drying, it has a density of 12.5 pounds per cubic foot. The quicklime which was used had a reactive CaO content of 94 percent, the Supersil used had a reactive $SiO_2$ content of 95 percent, and was devoid of alumina, and the portland cement has he following composition: $3CaO\cdot SiO_2$—45%, $$2CaO\cdot SiO_2\text{—}27\%,\ 4CaO\cdot Al_2O_3\cdot Fe_2O_3\text{—}8\%$$

and $3CaO\cdot Al_2O_3$—11%. The calcia, therefore, derived from the dicalcia and tricalcia silicates comprises 50.7 percent of the portland cement, while the silica derived from the dicalcia and tricalcia silicates in the portland cement comprises 21.2 percent of the portland cement. The total calcia from the calcium silicates and the quicklime, therefore, is 71 parts by weight or 1.27 mols. The total silica from the calcium silicates and the Supersil is 74.7 parts or 1.25 mols. The active calcia to silica ratio of the starting materials, therefore, is 1.01. The finished block had a modulus of rupture of 65 p.s.i.

The iron oxide and wollastonite are generally inert fillers and the iron oxide performs the additional function of coloring the product.

The upper limit of the $CaO/SiO_2$ ratio for tobermorite is less than the upper limit for xonotlite because alumina enters into the crystalline lattice during the early stages of formation of the tobermorite.

Examples 2 through 5 given in Table 1 are made in the same manner as in Example 1 using different proportions of starting materials.

Example 2 is a material having no portland cement and does not form a tobermorite gel network that bridges the fibrous materials, and consequently has too low a strength for an insulation material.

Example 3 is a material having a low level of portland cement but sufficient to form a tobermorite gel network between fibers. Example 3 is approximately at the lower level of the desired calcium silicate to free lime ratio.

Example 4 demonstrates the properties obtained by a high calcium silicate to free lime ratio.

Example 5 demonstrates the low strength obtained when too high a ratio of calcium silicate to free lime is used.

TABLE 1

| Raw materials [1] | Example 2 | Example 3 | Example 4 | Example 5 |
|---|---|---|---|---|
| Asbestos | 22.65 | 21.98 | 19.77 | 19.38 |
| Quicklime | 33.98 | 26.11 | 4.07 | 0.12 |
| Supersil | 35.39 | 31.74 | 20.87 | 18.96 |
| Celetom | | | | |
| Limestone | | | | |
| Clay | | | | |
| Portland cement | | 12.40 | 48.30 | 54.67 |
| Iron oxide | 0.50 | 0.52 | 0.47 | 0.47 |
| Wollastonite | 7.48 | 7.25 | 6.52 | 6.40 |
| Coated glass fiber | | | | |
| Percent CaO from cement | | 16.9 | 86.5 | 99.0 |
| Water-solids ratio | 4.7 | 4.7 | 4.7 | 4.7 |
| $CaO/SiO_2$ molar ratio | 1.017 | 1.011 | 1.014 | 1.014 |
| Density | 12.5 | 12.5 | 12.5 | 12.5 |
| Modulus of rupture, p.s.i. | 35 | 50 | 60 | 30 |

[1] The figures opposite materials are percent by weight.

Examples 6, 9, and 12 of Table 2 give compositions of starting materials which form a tobermorite gel that is converted into crystalline tobermorite. The materials of Examples 6, 9, and 12 are mixed into a slurry, prehardened, and autoclaved in the same manner as are the materials of Examples 1 through 5, and the slurry is maintained at 80° F. for a period of approximately 2 hours before pouring into the molds. During this time, there is slow gentle agitation in the holding tank. The material of Example 6 forms a tobermorite gel network which is transformed into an acceptable insulation material.

TABLE 2

| Raw materials [1] | Example 6 | 7 | 8 | 9 | 10 | 11 | 12 |
|---|---|---|---|---|---|---|---|
| Asbestos | 16.12 | 15.60 | 14.18 | 15.08 | 15.20 | 15.60 | -------- |
| Quicklime | 20.00 | 10.20 | 5.18 | 1.56 | 25.40 | 11.80 | 10.20 |
| Supersil | 14.83 | 13.19 | 12.92 | 12.67 | 16.83 | 27.08 | 13.19 |
| Celetom | 17.03 | 12.27 | 11.89 | 10.51 | 19.90 | -------- | 12.27 |
| Limestone | 7.58 | 7.33 | 6.67 | 7.83 | 7.49 | 7.32 | 7.33 |
| Clay | 3.22 | 3.12 | 2.84 | 3.12 | 3.19 | -------- | 3.12 |
| Portland cement | 9.09 | 23.45 | 34.66 | 38.59 | -------- | 23.35 | 23.45 |
| Iron oxide | -------- | -------- | -------- | -------- | -------- | -------- | -------- |
| Wollastonite | 12.13 | 14.84 | 11.66 | 10.64 | 11.99 | 14.85 | 14.84 |
| Coated glass fibers | -------- | -------- | -------- | -------- | -------- | -------- | 15.60 |
| Percent CaO from cement | 18.7 | 49.8 | 80.1 | 93.0 | -------- | 49.8 | 49.8 |
| Water-solids ratio | 6.0 | 6.0 | 6.0 | 6.0 | 6.0 | 6.0 | 6.0 |
| CaO/SiO[2] molar ratio | .793 | .791 | .781 | .742 | .753 | .800 | .791 |
| Density | 11.5 | 11.5 | 11.5 | 11.5 | 11.5 | 11.5 | 11.5 |
| Modulus of rupture p.s.i | 60 | 65 | 50 | 35 | 40 | 17 | 65 |

[1] See footnote at end of Table 1.

The material of Example 7 is a preferred tobermorite insulation material. Example 8 demonstrates the approximate upper limit of portland cement. Example 9 is weak because it has developed a tobermorite gel network in the holding tank, and Example 9 demonstrates that this broken tobermorite gel structure is not healed by the prehardening operation.

Example 10 does not contain portland cement, and, therefore, does not form a tobermorite gel as the initial step.

It will be noted that the materials of Examples 6 through 9 all contain reactive alumina in the form of clay, and it is found that reactive alumina induces the transformation of tobermorite gel into a fully developed tobermorite crystalline structure. An aluminum silicate, such as occurs in portland cement, does not interfere with the formation of xonotlite or induce formation of tobermorite.

Example 11 demonstrates a material prepared in the same manner as the materials of Examples 6 through 10, but contains too low an amount of active alumina to induce the formation of the crystalline structure. In general, more than approximately ½% is required, and preferably between 1 and 5%. The finished product, therefore, is weak in modulus.

Example 12 is similar to Example 7 except for the fibrous material and demonstrates that suitable insulation material can be made by substituting other types of fibrous material for the asbestos. The fibers used in the material of Example 12 were silica fibers having 10 percent by weight of the coated fiber of a coating of phenol formaldehyde. Other types of resinous coatings can be used, as for example polyvinyl chloride, other phenolic resins, butyl rubber elastomers, acrylonitrile elastomer, neoprene elastomers, etc.

It will now be seen that the transformation of calcium silicates into a tobermorite gel is accomplished at temperatures between approximately 160° F. and 212° F., in the period of time involved in commercial processes. It is further apparent that the formation of the tobermorite gel network between fibers must be complete and nondisrupted before the material is autoclaved, if the finished product is to have acceptable strength. Materials having a modulus of less than approximately 45 p.s.i. are considered unacceptable as insulation materials. If the slurry is not heated, the network does not bridge the fibrous material, so that a finished product of too low a strength is achieved. If a network is developed which connects the fibers and is then disrupted by agitation, etc. the network is not re-established by prehardening, and poor strength is achieved in the finished product. It is further apparent that all of the calcia requirement cannot be obtained from calcium silicate, and that from approximately 10 percent to approximately 90 percent of the total calcia requirement must come from free calcia dispersed throughout the tobermorite gel network adjacent undissolved particles of silica. Preferably, the free calcia should provide between 15 and 90% for xonotlite, and between 15 and 80% for tobermorite.

The amount of calcia present in the above examples is determined by using a factor of .507 as the amount of calcia in the dicalcia silicate and tricalcium silcate of the portland cement, and .45 for the active silica in the clay. The active silica is determined by using the ratio of .212 for the silica in the dicalcia and tricalcia of the portland cement, .95 for the silica in Supersil, .83 for the silica in celatom, and .304 for the silica in the sodium silicate. The remainder of the materials are considered inert. The calcia in dicalcia and tricalcium silicates divided by the total active calcia provides the percent of CaO from the portland cement. The molar ratio of the active calcia and the active silica as computed above provides the molar ratio of calcia to silica. The active calcia and active silica in portland cement comprises 72 percent of the portland cement, and the remainder of the portland cement is tricalcia alumina and $4CaO \cdot Al_2O_3 \cdot Fe_2O_3$, both of which are generally inert to the formation of a proper calcium silicate structure. The tricalcium alumina will, however, take on some calcium hydroxide to make it unavailable for the formation of a calcium silicate structure, and this may be helpful in aiding the diffusion of silica into the tobermorite gel structure. The active calcia to active silica ratio for the formation of xonotlite is preferably held between 0.95 and 1.20 percent, and the active calcia to silica for the formation of tobermorite is preferably held between 0.65 and 0.85. It will be understood that during autoclaving, some of the silica need not be dissolved, and will remain as a filler. The Celatom [1] contains active alumina of approximately 10 percent. The active alumina in the slurry should not exceed approximately 10 percent of the calcium silicate, otherwise, it modifies the lattice of the tobermorite gel to a degree which weakens the product. Between 0.5 and 3.0 is preferred to induce formation of crystalline tobermorite. Likewise, too high a concentration of sodium in the slurry alters the gel lattice and weakens the product. Also, dissolved silica in the slurry will interfere with the formation of a proper tobermorite gel lattice. The sodium and silicate should not exceed the level which occurs when sodium silicate is dissolved in the slurry to a degree comprising 10% of the calcium silicate present.

In order to produce insulation materials of acceptable strength, and having a xonotlite binder, the slurry should preferably consist of the following solid materials in percent by weight:

| | |
|---|---|
| Calcium silicate | 5–25 |
| Lime | 3–30 |
| Silica | 18–40 |
| Fibrous materials | 10–25 |

[1] Celatom is a trade name of Eagle Pitcher Co. for diatomaceous earth.

In order to produce an acceptable insulation material having a tobermorite binder, the slurry should preferably consist of the following materials in percent by weight:

| | |
|---|---|
| Calcium silicate | 3–20 |
| Lime | 3–35 |
| Silica | 20–25 |
| Fibrous materials | 10–25 |

The broad ranges then for the formation of insulation having calcium silicate binder is:

| | |
|---|---|
| Calcium silicate | 3–25 |
| Lime | 3–30 |
| Silica | 18–40 |
| Fibrous materials | 10–25 |

The broad range using portland cement will comprise the following percentages by weight:

| | |
|---|---|
| Portland cement | 8–35 |
| CaO | 3–30 |
| $SiO_2$ | 18–40 |
| Fibrous material | 10–25 |
| Active alumina | 0.5–3.0 |

While the invention has been described in considerable detail, I do not wish to be limited to the particular embodiments described, and it is my intention to cover hereby all novel adaptations, modifications and arrangements thereof which come within the practice of those skilled in the art to which the invention relates.

I claim:

1. The process of producing high temperature insulation comprising fibrous material strongly bonded together by calcium silicate crystals comprising: preparing a slurry of fibers which withstand autoclaving at superatmospheric temperature and pressures, and siliceous and calcareous materials having an active CaO to $SiO_2$ ratio between 0.65 and 1.20 and in which from 15 to 90 percent of the active CaO is in the form of a material from the group consisting of dicalcium silicate and tricalcium silicate, said slurry also containing free lime in an amount exceeding approximately 10 percent of the active CaO requirement, shaping the solids of said slurry into desired configuration in the presence of water in excess of that required to form the gel and hydrate the lime, heating the shaped solids and water while in a quiescent state at atmospheric pressure for a sufficient time to form an undisrupted tobermorite gel network bridging the fibers and having the general formula $3CaO \cdot 2SiO_2 \cdot 3H_2O$, and autoclaving the quiescent materials to convert the tobermorite gel network into a crystalline structure bridging the fiber.

2. The process of claim 1 wherein the active calcia to silica ratio is more than approximately 1, the slurry is substantially devoid of active alumina, and said tobermorite gel is transformed substantially completely to xonotlite.

3. The process of claim 2 wherein the solid materials used to form the slurry consist essentially of:

| | |
|---|---|
| Calcium silicate | 5–25 |
| Lime | 3–30 |
| Silica | 18–40 |
| Fibrous material | 10–25 |

the calcia to silica ratio of the materials being between approximately 0.95 and approximately 1.2 and the water in the shaped solids is more than approximately 4.0 times the weight of the solids.

4. The process of claim 1 wherein the slurry has the following in percent by weight:

| | |
|---|---|
| Portland cement | 10–50 |
| Lime | 3–30 |
| Silica | 18–40 |
| Fibrous material | 10–25 |

5. The process of producing high temperature insulation comprising fibrous materials strongly bonded together by xonotlite comprising: preparing a slurry consisting essentially of the following solids:

| | |
|---|---|
| Calcium silicate | 5–25 |
| Lime | 3–20 |
| Silica | 18–40 |
| Fibrous material | 10–25 |

with the active calcia to active silica ratio being between approximately 1.0 and approximately 1.1 and substantially devoid of reactive alumina, shaping the solids of said slurry into desired configuration having a water to solids ratio of from approximately 4.0 to approximately 10, maintaining the shaped solids and water while in a quiescent state at a temperature above 160° F. for a sufficient time to grow an undisrupted tobermorite gel network having the general formula $3CaO \cdot 2SiO_2 \cdot 3H_2O$ and converting the tobermorite gel network into crystalline xonotlite bridging the fibers.

6. The process of claim 5 wherein the slurry has the following percent by weight:

| | Approximately |
|---|---|
| Portland cement | 48 |
| Lime | 4 |
| Silica | 21 |
| Fibrous materials | 20 |

7. The process of claim 1 wherein the slurry is poured into molds at a temperature below 160° F., the molds and slurry therein are heated by atmospheric steam to produce a tobermorite gel between fibers, and the undisrupted gel network is autoclaved and converted into a calcium silicate crystalline binder.

8. The process of claim 4 wherein the surry is poured into molds at a temperature below 160° F., the molds and slurry therein are heated by atmospheric steam to produce a tobermorite gel between fibers, and the undisrupted gel network is autoclaved and converted into a calcium silicate crystalline binder.

9. The process of producing high temperature insulation comprising fibrous materials strongly bonded together by crystalline calcium silicate, comprising: preparing a slurry having a CaO to $SiO_2$ ratio between 0.65 and 1.20 and consisting essentially of:

| | |
|---|---|
| Calcium silicate | 3–20 |
| Lime | 3–25 |
| Silica | 20–35 |
| Active alumina | 0.5–3.0 |
| Fibrous materials | 10–25 |

shaping the solids of said slurry into desired configuration having a water to solids ratio of from approximately 6.0 to approximately 10, maintaining the shaped solids and water while in a quiescent state at a temperature above 160° F. for a sufficient time to grow an undisrupted tobermorite gel network between fibers and having the general formula $3CaO \cdot 2SiO_2 \cdot 3H_2O$, and autoclaving the quiescent materials to convert the tobermorite gel network into crystalline tobermorite bridging the fibers.

10. The process of claim 9 wherein the shaped solids and water are heated in a quiescent state with steam at atmospheric pressure.

11. The process of claim 10 wherein portland cement is used as the source of calcium silicate.

12. The process of claim 9 wherein the slurry is produced at a temperature below 160° F. and is poured into molds followed by the step of heating the molds and contents with steam at atmospheric pressure.

13. The process of claim 9 wherein the solids of the slurry are formed from the following in approximate percentages by weight:

| | |
|---|---|
| Portland cement | 8–35 |
| Lime | 3–30 |
| Silica | 18–40 |
| Fibrous material | 10–25 |
| Active alumina | 0.5–3.0 |

14. The process of claim 13 wherein the slurry is poured into molds followed by the step of heating the molds and contents with steam at atmospheric pressure before autoclaving.

References Cited

UNITED STATES PATENTS

| | | | |
|---|---|---|---|
| 2,665,996 | 1/1954 | Kalousek | 106—120 |
| 2,766,131 | 10/1956 | Seipt | 106—120 |
| 3,166,511 | 1/1965 | Matsch et al. | 252—62 |
| 3,257,220 | 6/1966 | Kalousek et al. | 106—120 |
| 3,316,116 | 4/1967 | Podschus | 106—120X |
| 3,317,643 | 5/1967 | Denny | 106—120X |
| 3,406,030 | 10/1968 | Perraudin et al. | 106—120X |
| 3,449,141 | 6/1969 | Binkley et al. | 252—62X |
| 3,450,547 | 6/1969 | Sams et al. | 252—62X |
| 3,505,439 | 4/1970 | Moorehead et al. | 106—120X |

HAROLD ANSHER, Primary Examiner

U.S. Cl. X.R.

106—120; 264—235